(No Model.)
S. S. SADORUS.
REAPING OR MOWING MACHINE.
No. 585,704. Patented July 6, 1897.
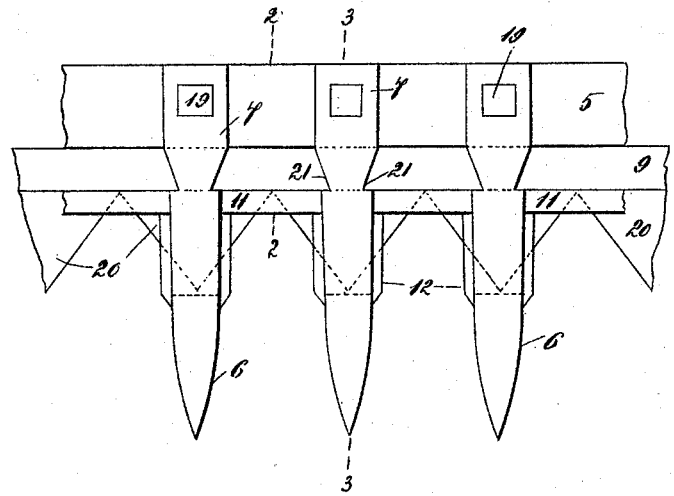
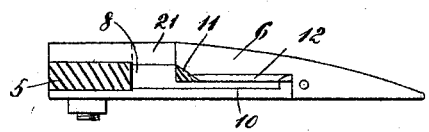
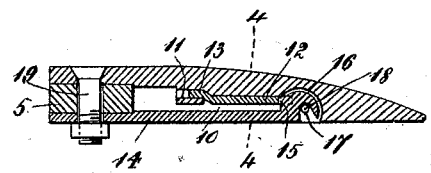
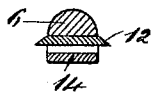
WITNESSES
John Buckler,
C. Gerst
INVENTOR
Samuel S. Sadorus
BY
Edgar Tate
ATTORNEYS

UNITED STATES PATENT OFFICE.

SAMUEL SUVER SADORUS, OF SARILDA, IDAHO.

REAPING OR MOWING MACHINE.

SPECIFICATION forming part of Letters Patent No. 585,704, dated July 6, 1897.

Application filed July 11, 1896. Serial No. 598,828. (No model.)

*To all whom it may concern:*

Be it known that I, SAMUEL SUVER SADORUS, a citizen of the United States, and a resident of Sarilda, in the county of Fremont and State of Idaho, have invented certain new and useful Improvements in Reaping or Mowing Machines, of which the following is a specification, reference being had to the accompanying drawings, forming a part thereof, in which similar numerals of reference indicate corresponding parts wherever found throughout the several views.

This invention relates to reaping and mowing machines, and particularly to the cutters and finger-bars thereof; and the object of the invention is to provide improved guard-fingers therefor, by means of which the clogging of the cutters is prevented.

The invention is fully disclosed in the following specification, of which the accompanying drawings form a part, in which—

Figure 1 is a plan view of a part of a finger-bar and the cutters mounted therein, said finger-bar being provided with my improved guard-fingers; Fig. 2, a section on the line 2 2 of Fig. 1; Fig. 3, a section on the line 3 3, and Fig. 4 a section on the line 4 4 of Fig. 3.

In the practice of my invention I provide a finger-bar 5, which is connected with the machine in the usual manner, and I also provide the usual number of guard-fingers 6, which are of the form shown in the drawings, said guard-fingers being each provided with a shank 7, which rests upon the finger-bar, and being transversely cut away at 8 to form a transverse passage for the cutter-bar 9, and forwardly of said transverse passage the under portion thereof is cut away, as shown at 10 in Figs. 2 and 3, and immediately in front of the transverse passage is a triangular cross-piece 11, and in front of this cross-piece 11 is a plate 12, the rear end of which is provided with an extension 13, which is inserted beneath the cross-piece 11 or into a slot formed therein, and the front end of which is held in place by a detachable plate 14, which is provided at its forward end with a transverse shoulder 15, on which the forward end of the plate 12 rests, and each guard-finger is provided with a segmental cavity or recess 16, through which passes a pin 17, and the forward end of the plate 14 is provided with a hook 18, which is adapted to be passed over the pin 17, and the rear end of the plate 14 rests beneath the finger-bar 5 and is secured thereto by a bolt 19, which passes through the rear end of the guard-finger and through the finger-bar and through said plate 14.

The sides of the plate 12 are beveled or downwardly inclined, as shown in Fig. 4, and the cutters 20 pass between the plate 12 and the plate 14, with which each of the guard-fingers is provided, and the transverse cross piece or bar 11 serves to prevent the clogging of the cutters and the stoppage thereof. It will also be seen that the shanks 7 of the guard-fingers are cut away at their opposite sides, as shown at 21, directly over the cutter-bar 9, but this feature of construction is immaterial and may or may not be employed.

The plates 12 may be provided with sharp cutting edges, and they are detachable, as will be understood, and may be sharpened whenever desired, and in practice the cutters 20 are preferably beveled on their under side, so as to bring their cutting edges and the edges of the plate 12 together in the operation of the machine, and, as will be seen, the transverse bar 11, which assists in holding the plates 12 in position, also forms a guide for and holds the cutter-bar 9 in position.

The plates 12 and the means by which they are connected with the guard-fingers constitute the chief features of this invention and are well adapted to accomplish the result for which they are intended, and my invention is not limited to the exact form thereof or to the means herein described for securing them to the guard-fingers, and I reserve the right to make all such alterations therein and modifications thereof as fairly come within the scope of the invention.

Having fully described my invention, I claim as new and desire to secure by Letters Patent—

1. The combination with the guard-fingers, of the finger-bar of a reaper or mower, of detachable plates connected with the under side of each of said guard-fingers, beneath which the cutters pass, said plates being provided with beveled and cutting edges, and being held in place by detachable plates, which are connected with each guard-finger at its forward end, by means of a hook or projection, operating in a cavity or recess formed therein, and by means of a bolt which passes through the rear end of the guard-fingers, and through the finger-bar, substantially as shown and described.

2. The combination with the guard-finger, of the finger-bar of a reaper or mower, of detachable plates connected with the under side of each of said guard-fingers, beneath which the cutters pass, said plates being provided with beveled and cutting edges, and being held in place by a detachable plate, which is connected with each guard-finger at its forward end, by means of a hook or projection, operating in a cavity or recess formed therein, and by means of a bolt which passes through the rear end of the guard-finger, and through the finger-bar, and said guard-finger being also provided with a transverse bar, which is connected therewith forwardly of the cutter-bars, and which assists in holding the detachable plates in position, substantially as shown and described.

3. The combination with the finger-bar of a reaper or mower, provided with the usual guard-fingers, and with the usual cutters, of detachable plates, connected with the under sides of the guard-fingers and directly over the cutters, and said plates being provided with cutting edges, and said guard-fingers being provided with a transverse bar secured to each in front of the passage-way for the cutter-bar and to which transverse bar the rear ends of detachable plates are secured, substantially as shown and described.

In testimony that I claim the foregoing as my invention I have signed my name, in presence of the subscribing witnesses, this 29th day of June, 1896.

SAMUEL SUVER SADORUS.

Witnesses:
FRANK COX,
A. H. MCCONNELL.